(12) United States Patent
Van Der Meulen

(10) Patent No.: US 6,410,076 B1
(45) Date of Patent: *Jun. 25, 2002

(54) METHOD AND APPARATUS FOR PRODUCING PACKED FRESH CURD BLOCKS

(75) Inventor: Wieger Van Der Meulen, Damwoude (NL)

(73) Assignee: Tetra Laval Holdings & Finance S.A., Den Haag (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/195,064
(22) Filed: Nov. 18, 1998

(30) Foreign Application Priority Data

Nov. 18, 1997 (NL) .............................................. 1007571

(51) Int. Cl.[7] .............................................. A23C 19/00
(52) U.S. Cl. ........................ 426/582; 426/512; 426/518; 99/454; 99/456; 100/193
(58) Field of Search .................................. 426/582, 512, 426/518; 99/454, 456; 100/193

(56) References Cited

U.S. PATENT DOCUMENTS

| 3,645,751 A | * | 2/1972 | Wakeman et al. | 426/582 |
| 5,082,681 A | * | 1/1992 | Barlow et al. | 426/495 |
| 5,175,014 A | * | 12/1992 | Brockwell et al. | 426/582 |
| 5,324,529 A | * | 6/1994 | Brockwell | 426/392 |

FOREIGN PATENT DOCUMENTS

| EP | 0 336 649 A | | 10/1989 | |
| NL | 7612636 A | | 5/1977 | |
| WO | 119127 A1 | * | 9/1984 | 425/297 |
| WO | WO 93/22903 A | | 11/1993 | |

* cited by examiner

Primary Examiner—Milton I. Cano
Assistant Examiner—H. Mai
(74) Attorney, Agent, or Firm—Fulbright & Jaworski L.L.P.

(57) ABSTRACT

Method and apparatus for producing packed fresh curd blocks, wherein curd blocks are formed using at least one block former, subsequently packaged and discharged for further handling, wherein a curd block after leaving a block former is placed in a conveying holder, the conveying holder is conveyed via suitable first conveying device to an automatic packaging apparatus, and the curd block is removed from the conveying holder at the automatic packaging apparatus and subsequently packaged.

34 Claims, 7 Drawing Sheets

METHOD AND APPARATUS FOR PRODUCING PACKED FRESH CURD BLOCKS

Figure 1:
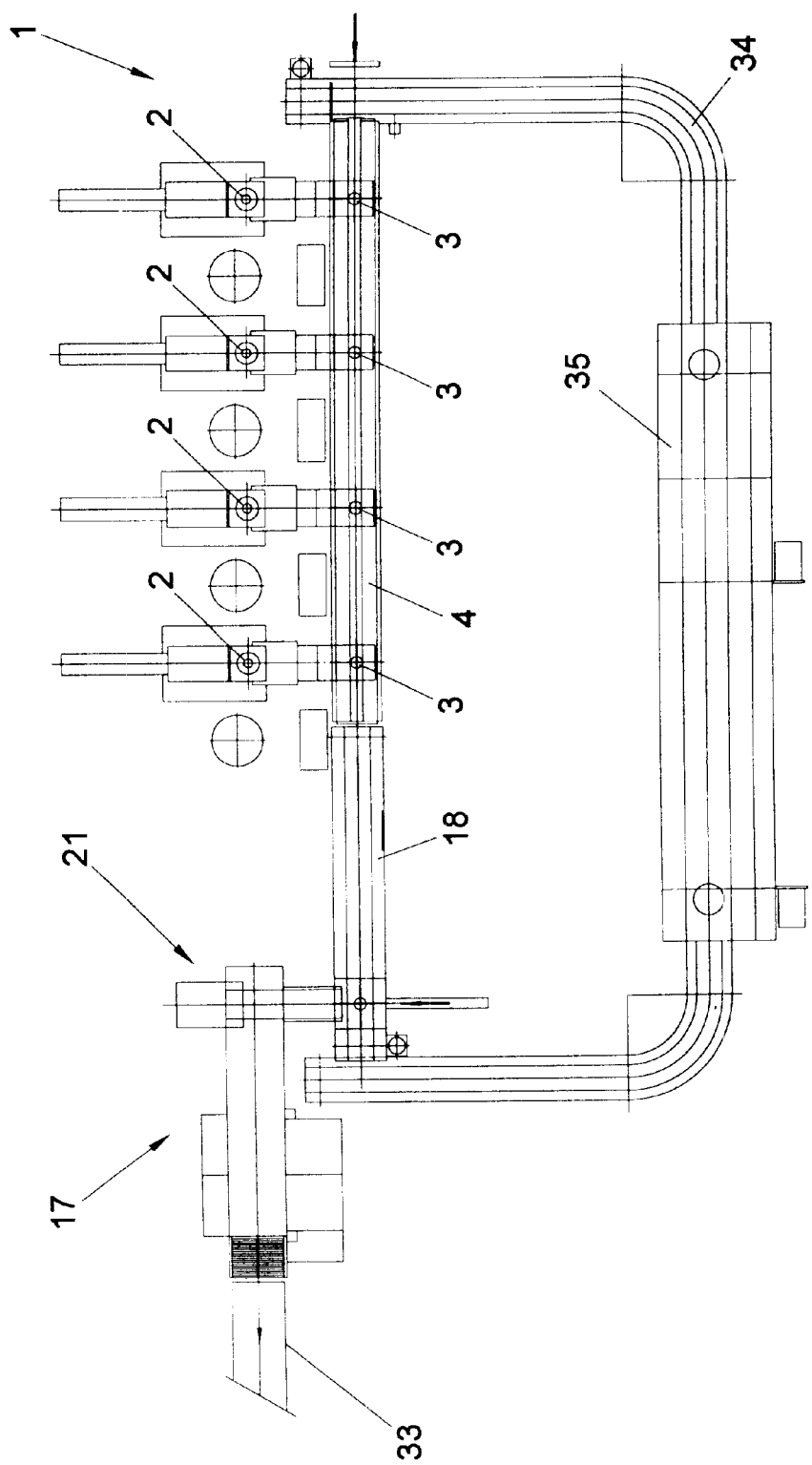

This invention relates to a method for producing packed fresh curd blocks, wherein curd blocks are formed using at least one block former, subsequently packed and discharged for further handling. This invention also relates to a cheese production apparatus in which the method can be applied.

The invention is suitable in particular for use in the production of cheddar cheese and similar cheese types. In the production of such cheese types the curd is pre-drained and dried, for instance in a cheddar machine of the type Alfomatic, and the curd thus obtained is so treated that pieces of curd, commonly referred to by the term of (curd) chips, are formed. The chips are fed to the top of a block former column, in which further consolidation and drainage occur. At the lower end of the block former a horizontal blade is disposed, commonly referred to as guillotine blade. The guillotine blade in the rest position closes off the underside of the block former and is retracted at predetermined intervals, so that the pillar of curd situated in the block former can move downwards. While doing so, the pillar of curd is supported by a platform, also moving downwards, which in turn is supported and controlled by a pneumatic cylinder or the like. When the pillar of curd has descended over a predetermined distance, the guillotine blade moves into the rest position again, whereby a block of curd is cut off.

According to the known technique, the blocks are pushed from under the guillotine blade by a push cylinder. In the process, the block passes a guide means, which can be designed as a short horizontal tube of rectangular cross section and which terminates in front of a conveyor track. Arranged at the free end of the tube is a plastic bag of a suitable material, for instance polyethylene. A block so packed in a bag is discharged via the conveyor track, which conventionally comprises a conveyor extending in transverse direction along a number of block formers. The bags are closed and evacuated. The blocks can then be conveyed to a storage room to ripen.

A drawback of the known technique is that the plastic bags at each block former are placed by hand, which is time consuming and unattractive work.

The object of the invention is to obviate the drawback outlined and generally to provide a method and apparatus by means of which blocks produced by a block former can be packaged in an efficient, hygienic and reliable manner.

To that end, according to the invention, a method of the above-described type is characterized in that a curd block, after leaving a block former, is placed in a conveying holder, that the conveying holder is conveyed via suitable first conveying means to an automatic packaging apparatus, and that the curd block is removed from the conveying holder at the automatic packaging apparatus and is subsequently packed.

A cheese production apparatus comprising at least one block former and a conveyor track passing along the block former(s) is characterized, according to the invention, in that the conveyor track leads to a central automatic packaging apparatus and is arranged for conveying conveying holders which in operation receive a curd block in a transfer station at the block former(s) and release the curd block in a removal station at the packaging apparatus.

In the following, the invention is further described with reference to the accompanying drawing.

Figure 6:
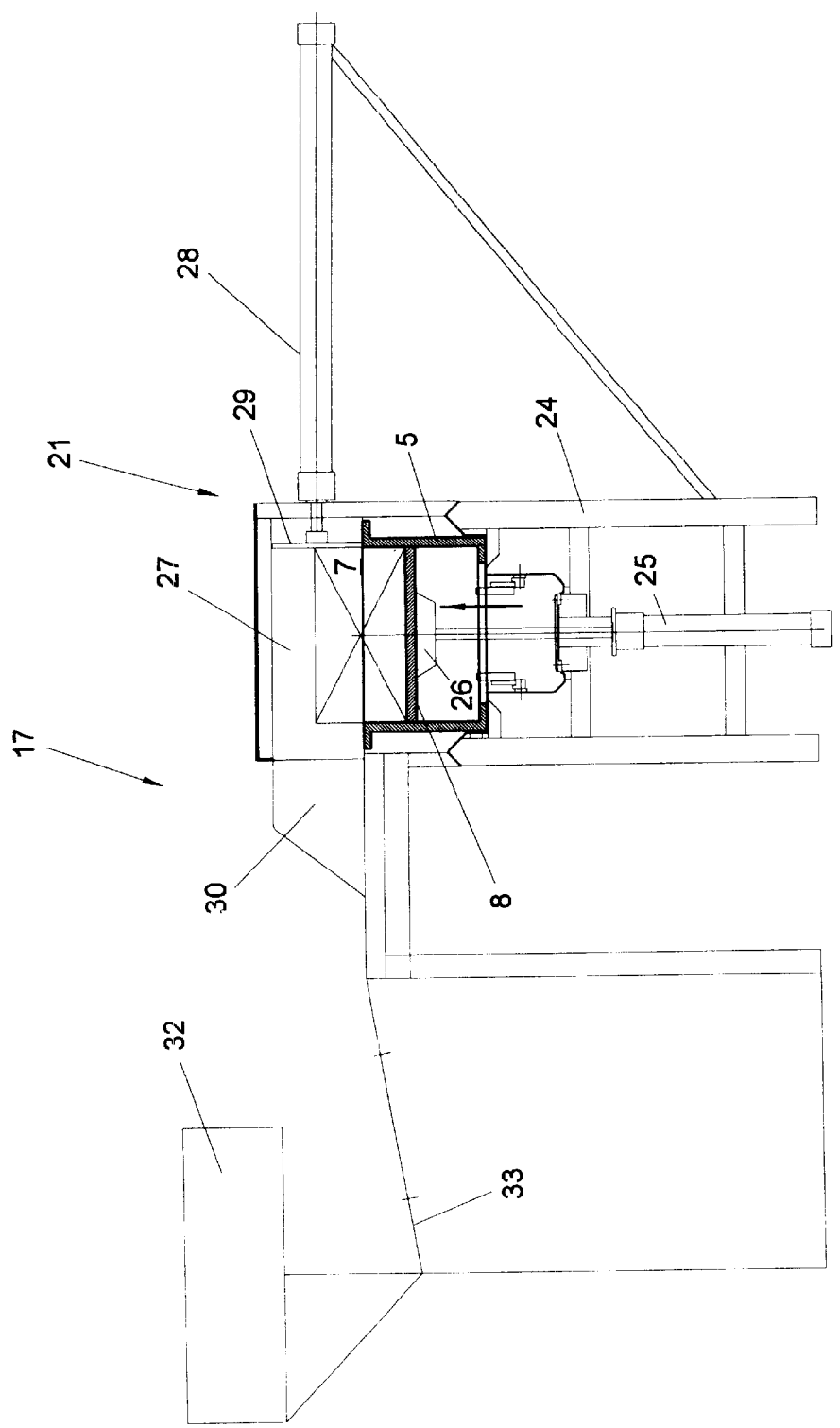
Figure 7:
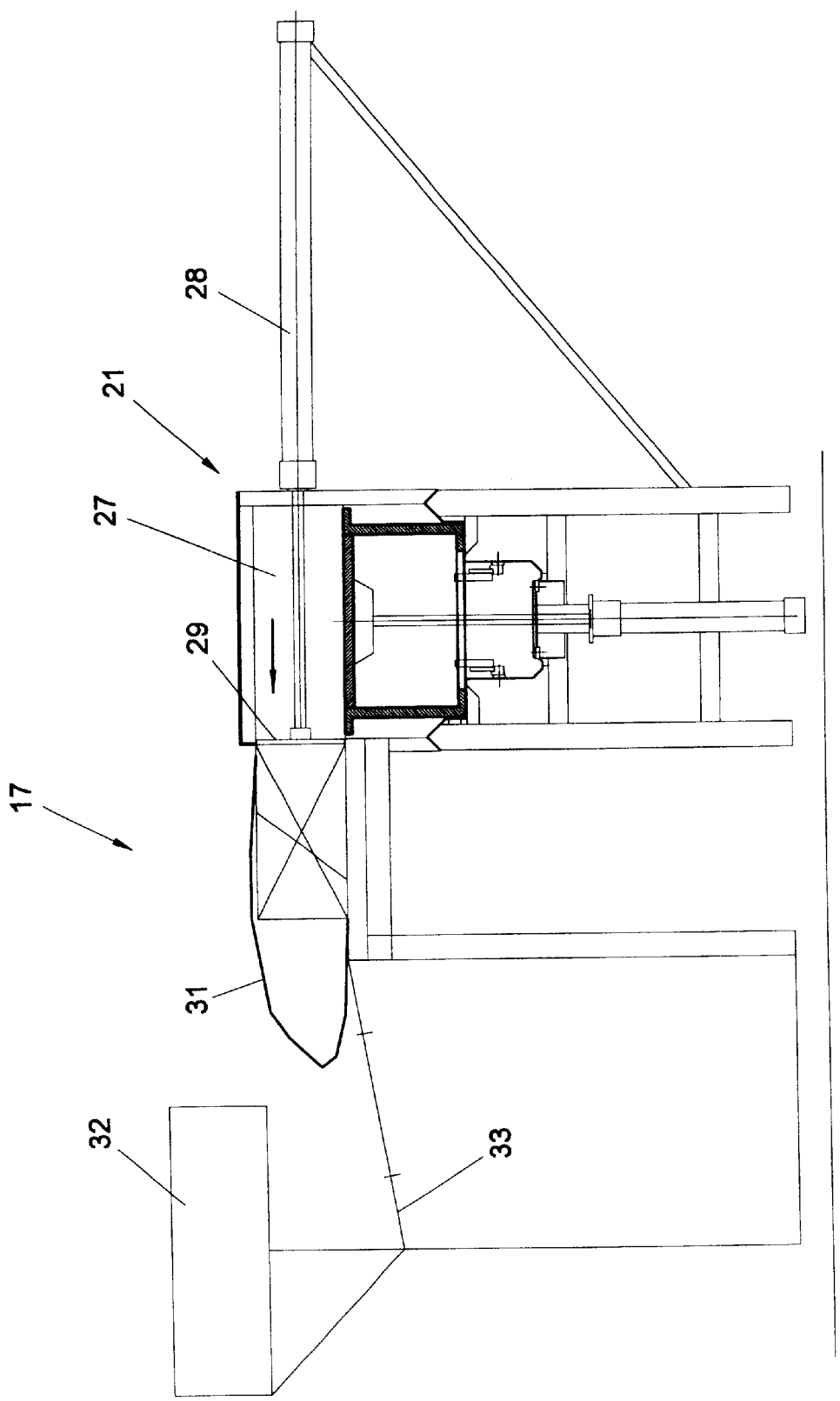

FIG. 1 schematically shows in top plan view a part of a cheese production apparatus;

FIGS. 2–5 schematically show a number of successive stages of an example of a method of transferring a curd block from a block former to a conveying holder;

FIGS. 6 and 7 schematically show an example of a method of packaging a curd block in a plastic bag.

FIG. 1 diagrammatically shows in top plan view an example of a part of a cheese production apparatus 1 in which the invention is applied. The cheese production apparatus shown comprises a number of block formers 2, four in the example shown. At the output end or front of each block former a transfer station 3 is arranged, in which the curd blocks produced by the block former are transferred to suitable conveying holders in a manner to be described in more detail below. A conveying holder, while receiving a block, is sitting on a conveyor 4 which at that time is not driven, or which passes under the conveying holder without carrying it along. A suitable conveyor is, for instance, a carrier pawl conveyor, known per se, but other types of conveyors can also be used. For positioning the conveying holders at the proper position and for releasing them for conveyance and for switching the conveyor on and off, if necessary, suitable detectors, known per se, such as, for instance, light barriers and/or proximity switches and the like can be used.

Figure 2:
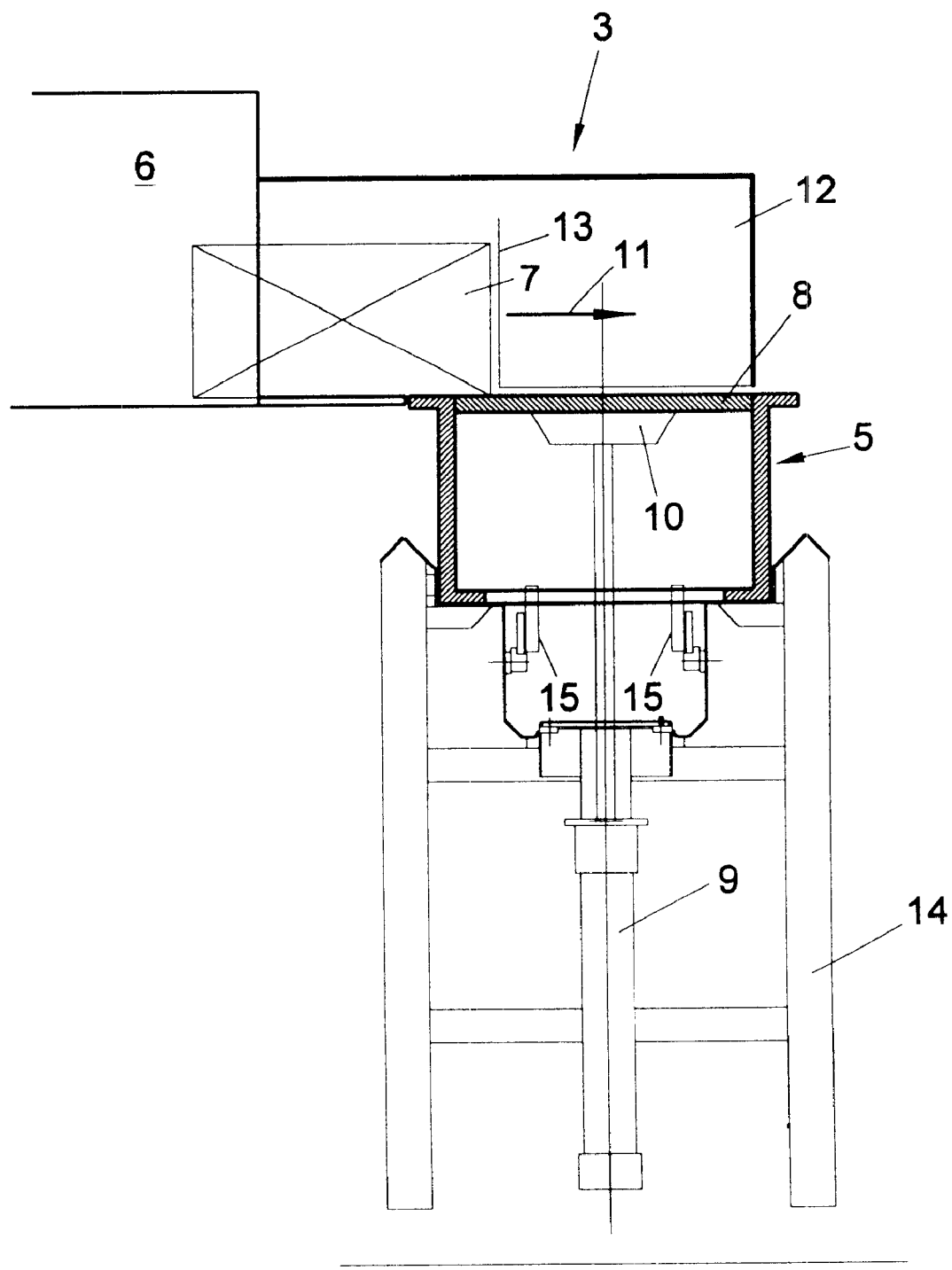

FIGS. 2–5 each show a conveying holder 5 disposed on the conveyor 4 in a transfer station 3 in different phases of the transfer of a curd block. FIG. 2 schematically shows the lower portion 6 of a block former and a curd block 7, produced by the block former, which has already been pushed to some extent from under the block former with the aid of means known per se, not shown.

The conveying holder 5 is disposed just under the level of the curd block 7 and has a bottom 8 adapted to move up and down. The bottom 8, in the situation shown in FIG. 2, is in the uppermost position. For moving the bottom 8 up and down, a lift cylinder 9 with a stamp 10 is present, which is disposed under the conveyor track.

The curd block 7 can therefore be pushed onto the bottom disposed in its uppermost position, as indicated by an arrow 11. To prevent damage and/or deformation of the curd block, guide plates 12, of which one is visible, are arranged on opposite sides of the path of the block as viewed in the pushing direction (arrow 11). The guide plates can be stationary or travelling plates. At the forward end, if desired, a travelling plate 13 can be used, so that during displacement the curd block is supported on three sides by guide means. On the fourth side there is a pushing element for displacing the curd block, so that the block is supported on four sides.

When the block is disposed entirely on the lifted bottom 8 of the conveying holder, the bottom 8 can be moved down. The block then descends gradually into the conveying holder and in doing so is guided by the walls of the conveying holder and, insofar as and as long as the block still projects above the conveying holder, by the guide plates.

FIG. 2 further shows the frame 14 of the conveyor track and the pawls 15 of the pawl conveyor used in this example.

Figure 3:
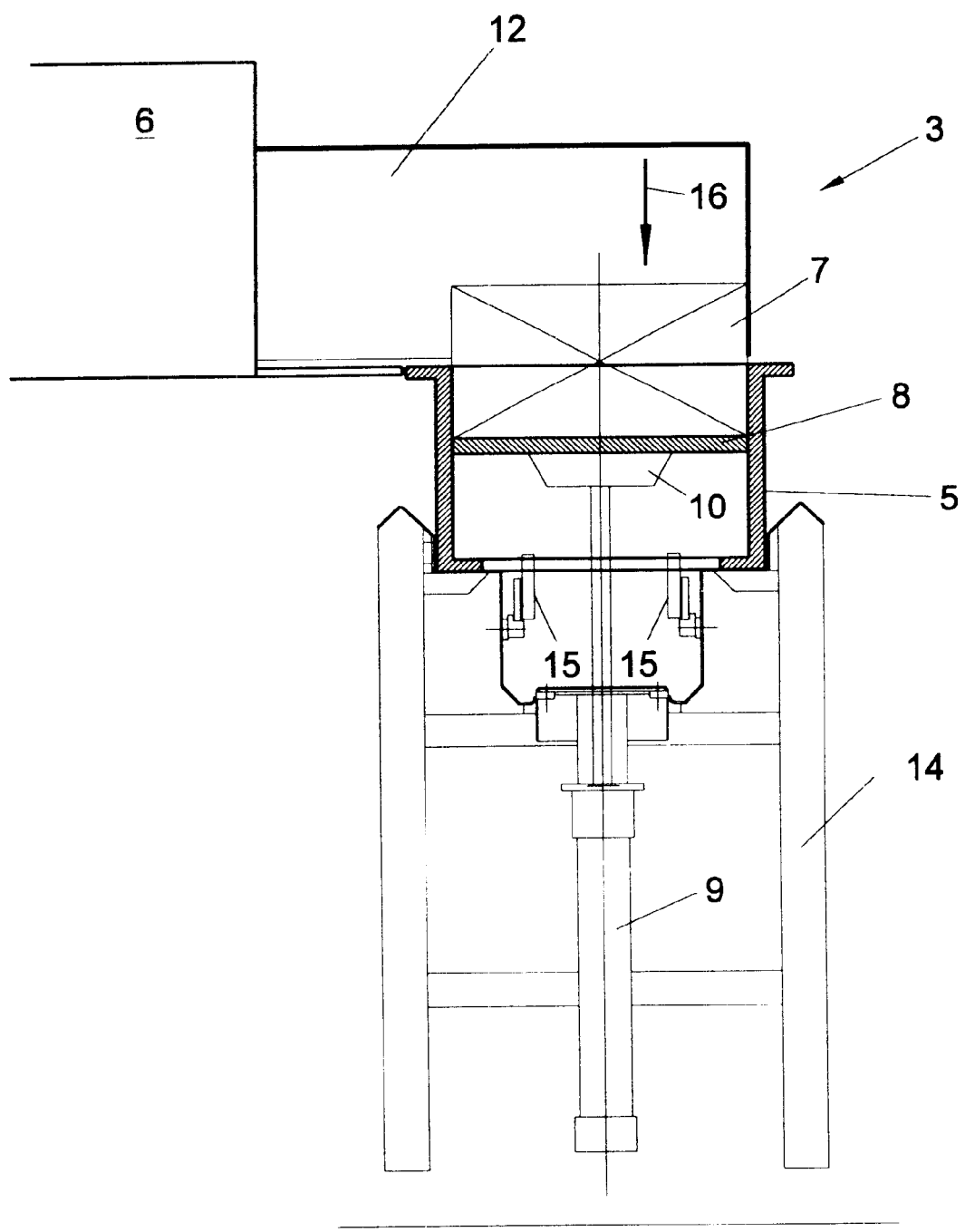
Figure 4:
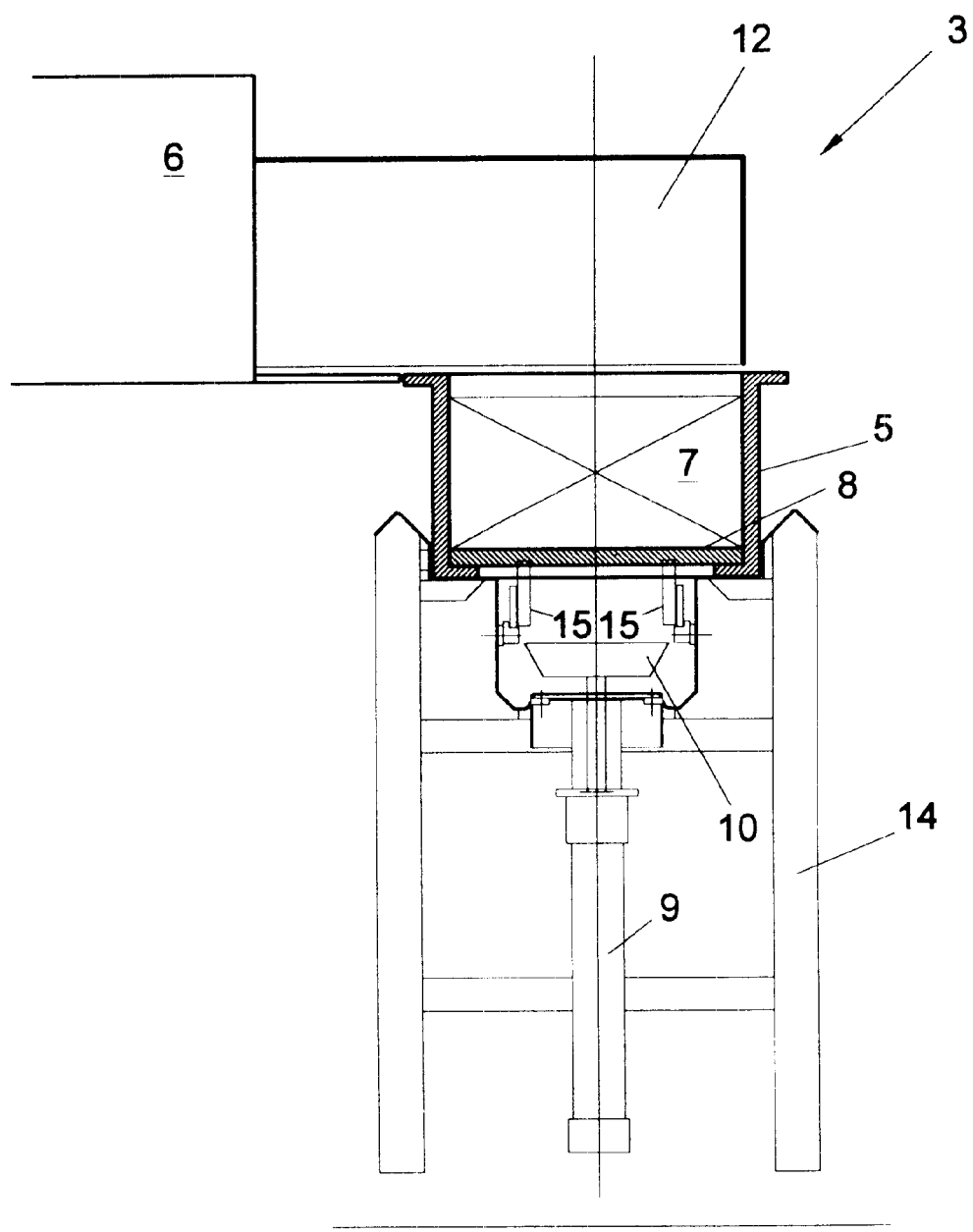

FIG. 3 shows in a similar view to FIG. 2 the situation where a curd block 7 descends into a conveying holder 5, as indicated by an arrow 16. In the situation shown in FIG. 4, the bottom 8 is in the lowermost position and the curd block 7 is accommodated entirely within the conveying holder. The conveying holder is now ready to be conveyed to a central packaging apparatus 17 (FIG. 1). Whether the conveyor is in fact switched on at that time, or the conveying holder is released, can depend on the phase the transfer process at other block formers served by the same conveyor is in. According to one possible practical method of operation, before conveyance commences, there is a waiting period until at each block former a filled conveying holder is ready.

The conveyor 4 can, in principle, feed the conveying holder directly to the packaging apparatus 17, but preferably an interposed buffer conveyor 18 is used, which has a buffer function and which connects to the packaging apparatus 17. The buffer conveyor 18 can, for instance, be a conveyor of the chain conveyor type or an apron conveyor.

Figure 5:
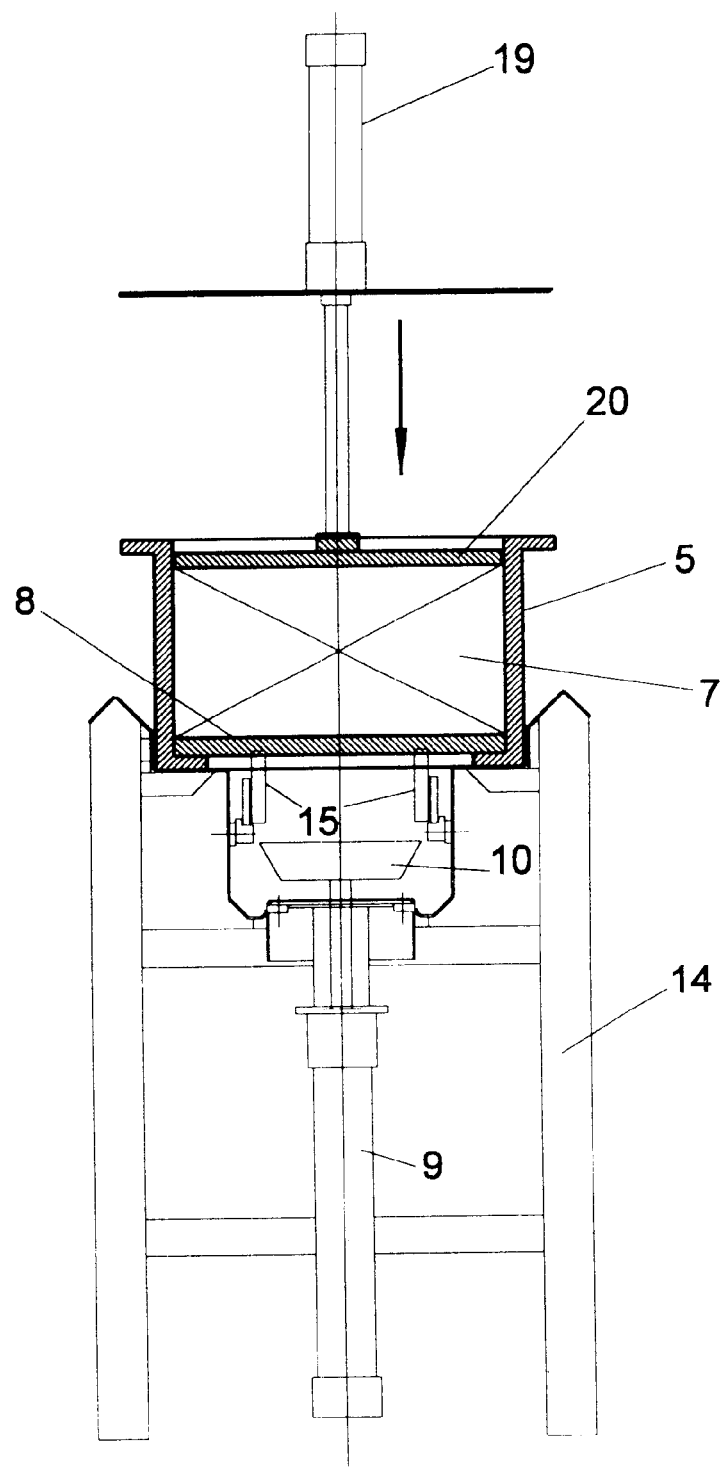

If desired, it is possible to momentarily press the curd block disposed in the conveying holder. This short pressing step is illustrated in FIG. 5 and can occur in a separate pressing station, not shown in FIG. 1. The pressing station can be provided with a press cylinder 19, as shown in FIG. 5, which is disposed above the conveying holder and which can exert the desired pressing force on the curd block via a pressure plate 20 fitting into the conveying holder and bearing on the curd block 7. Such a pressing step can be desirable, for instance, to increase the stability of the curd block in the case where the curd block is to be cut into smaller pieces prior to packaging. An increase of the stability can also be desirable to prevent deformation of the freshly packaged cheese without using temporary support forms of, for instance, plastic or cardboard. Also, curd blocks which have been produced shortly after a block former has been set into operation or shortly before the end of an operating cycle of a block former can have a lesser stability than the curd blocks produced during the rest of the operating cycle. In those cases too, a pressing step to increase the coherence of a curd block provides advantages.

Optionally, a combination of the transfer station and the pressing station is possible.

FIGS. 6 and 7 schematically show a central automatic packaging apparatus 17 with a removal station 21 arranged for removing a curd block from a conveying holder. This can be done by repeating the operations carried out in the transfer stations 3 in substantially reverse order. FIG. 6 schematically shows a frame 24 of the conveyor 18, with a lift cylinder 25 under it, which is provided with a stamp 26 by which the bottom of a conveying holder with a curd block can be moved up. FIG. 6 shows a curd block 7 already moved up in part. It is preferred that the removal station 21, similarly to the transfer stations, be provided with guide means for the curd block. Such a guide means is shown at 27 in FIG. 6 and FIG. 7. Operative between the guide means 27 is a pusher plate 29, operated by a cylinder 28, which can push a curd block over the lifted bottom 8 (FIG. 7) in the direction of a bag opener 30 or wrapper for foil or the like, connecting to the guide means. In FIG. 7 a plastic bag 31 is shown in which the curd block is packaged. FIGS. 6 and 7 further show schematically a bag magazine 32 and a discharge conveyor 33. The bag opener 30 and the bag magazine 32 form part of a commercially available automatic packaging machine which further comprises a vacuum and sealing unit, not shown. The thus obtained packaged curd blocks are discharged via a suitable conveyor track 33 to, for instance, a cheese store for further ripening.

The empty conveying holders can be returned to the transfer stations 3 via a return conveyor track 34. Preferably, the return conveyor track first leads the conveying holders through a rinsing tunnel 35 for cleaning the conveying holders.

A major advantage of the use of a central automatic packaging apparatus is that it can process the production of a number of block formers and that it is no longer necessary to arrange packaging material at each block former.

It is noted that after the foregoing, various modifications will readily occur to those skilled in the art. Thus, it is for instance possible to design the block formers in such a manner that the curd blocks descend into the conveying holders directly under the block formers. The conventional platform moving down under a block former is then at the same time the bottom of a conveying holder, also positioned under the block former. In that case, a horizontal push cylinder is not needed.

Further, it is possible to package the curd blocks not in bags but, for instance, in evacuated foil trays, in shrink film or by the so-called flow wrapping technique or the like. These and similar modifications are considered to fall within the framework of the invention.

What is claimed is:

1. A method for producing packed fresh curd blocks, comprising:
   forming a plurality of curd blocks using a plurality of curd block former columns into which curd chips are fed and consolidated;
   independently moving said formed curd blocks to and into respective conveyor holders; and
   after all of the plurality of formed curd blocks are placed in their respective conveyor holders, conveying each of said conveying holders from its associated curd block former column sequentially to a central automatic packaging apparatus wherein the curd blocks are removed from their respective conveying holders and subsequently packaged.

2. A method according to claim 1, characterized in that empty conveying holders are recirculated from the automatic packaging apparatus to the block formers via suitable return conveying means which, together with the first conveying means, form a loop-shaped track.

3. A method according to claim 2, characterized in that the empty conveying holders are passed through a cleaning station by the return conveying means.

4. A method according to claim 1, characterized in that conveying holders with a bottom adapted to move up and down are used.

5. A method according to claim 4, characterized in that when placing a curd block in a conveying holder, the bottom of the conveying holder is first brought into a high position at least at the level of the upper edges of the conveying holder, that subsequently the curd block is placed on the lifted bottom and that thereafter the bottom is lowered until the curd block is disposed entirely within the conveying holder.

6. A method according to claim 5, characterized in that the curd block, while being placed on the lifted bottom and being lowered, is laterally supported.

7. A method according to claim 1, characterized in that a curd block upon leaving a block former is directly supported by the bottom of a conveying holder situated under the block former and lowered.

8. A method according to claim 1, characterized in that a curd block after being lowered from a block former onto a lifted bottom of a conveying holder disposed in front of the block former.

9. A method according to claim 8, characterized in that a curd block while being displaced is supported on at least two sides by guide means.

10. A method according to claim 9, characterized in that the guide means travel at least partly along with the curd block.

11. A method according to claim 4, characterized in that a curd block is removed from a conveying holder by moving the bottom up into a high position at the level of the upper edges of the conveying holder or higher and that thereafter the curd block is moved off the lifted bottom.

12. A method according to claim 1, characterized in that a curd block, between leaving a block former and being packaged, is momentarily pressed.

13. A method according to claim 1, characterized in that a curd block, between leaving a block former and being packaged, is cut into smaller pieces.

14. A method according to claim 12, characterized in that pressing occurs while the curd block is disposed in a conveying holder.

15. An apparatus for the production of cheese, comprising:
- a plurality of curd block former columns, each suitable for receiving and consolidating curd chips;
- a plurality of transfer stations;
- a plurality of conveyor holders, at least one for each of said curd block former columns, for receding curd blocks from curd block former columns and independently transferring them to and into respective conveyor holders; and
- a conveyor track leading to a central automatic packaging apparatus having an associated removal station, said curd block former columns, transfer stations, conveyor holders, and conveyor track being arranged so that after all of the plurality of curd blocks are formed and placed in their respective conveyor holders, they can be conveyed in sequence to the removal station of said central automatic packaging apparatus.

16. A cheese production apparatus according to claim 15, characterized in that the conveyor track connects to a return conveyor track which extends from the removal station to the end of the conveyor track remote from the packaging apparatus.

17. A cheese production apparatus according to claim 16, characterized in that the return conveyor track passes along a cleaning station.

18. A cheese production apparatus according to claim 15, characterized by a buffer conveyor extending between the conveyor track and the packaging apparatus.

19. A cheese production apparatus according to claim 15, characterized in that the conveying holders are box-like holders open at the top and having a reciprocal bottom.

20. A cheese production apparatus according to claim 19, characterized in that the transfer station and/or the removal station comprise lifting means to move the bottom of a conveying holder between a lowermost position at the level of the lower edges of the conveying holders and an uppermost position at the level of the upper edges of the conveying holders or higher.

21. A cheese production apparatus according to claim 20, characterized in that the removal station is provided with a pushing element to push a curd block off a bottom of a conveying holder disposed in the lifted position.

22. A cheese production apparatus according to claim 20, characterized in that the transfer station is provided with a pushing element to push a curd block onto a bottom of a conveying holder disposed in the lifted position.

23. A cheese production apparatus according to claim 21, characterized by guide means which support a curd block on at least two sides during at least the operation of a pushing element.

24. A cheese production apparatus according to claim 23, characterized in that the guide means during the upward or downward movement of a curd block placed on the bottom of a conveying holder operatively support the curd block insofar as it projects above the conveying holder.

25. A cheese production apparatus according to claim 15, characterized in that the conveyor track is a carrier pawl conveyor.

26. A cheese production apparatus according to claim 15, characterized by a cutting station arranged between the block formers and the packaging apparatus.

27. A cheese production apparatus according to claim 15, characterized by a pre-pressing station arranged between the block formers and the packaging apparatus.

28. A cheese production apparatus according to claim 15, characterized in that the transfer station is disposed under a block former and that the conveyor track is arranged for passing the conveying holders under the block former for the conveying holders to receive directly a curd block descending from the block former.

29. A cheese production apparatus according to claim 15, characterized in that in front of each block former a transfer station is arranged and that pushing means are provided, capable of pushing a curd block formed by the block former, after it has been cut off, into the transfer station.

30. A cheese production apparatus according to claim 15, characterized in that the packaging apparatus is arranged for vacuum-packaging the curd blocks in bags.

31. A cheese production apparatus according to claim 15, characterized in that the packaging apparatus is arranged for packaging the curd blocks in film or foil packaging.

32. A method according to claim 13, characterized in that pressing occurs while the curd block is disposed in a conveying holder.

33. A cheese production apparatus according to claim 22, characterized by guide means which support a curd block on at least two sides during at least the operation of a pushing element.

34. A cheese production apparatus according to claim 24, characterized in that the transfer station is disposed under a block former and that the conveyor track is arranged for passing the conveying holders under the block former for the conveying holder to receive directly a curd block descending from the block former.

* * * * *